(12) United States Patent
Aoki

(10) Patent No.: US 6,882,365 B1
(45) Date of Patent: Apr. 19, 2005

(54) DIRECTION-SENSITIVE CORRECTION METHOD AND SYSTEM FOR DATA INCLUDING ABRUPT INTENSITY GRADIENTS

(75) Inventor: Shin Aoki, Kanagawa (JP)

(73) Assignee: Ricoh Company, Ltd. (JP)

(*) Notice: Subject to any disclaimer, the term of this patent is extended or adjusted under 35 U.S.C. 154(b) by 0 days.

(21) Appl. No.: 09/346,277

(22) Filed: Jul. 1, 1999

(30) Foreign Application Priority Data

Jul. 1, 1998 (JP) .......................................... 10-185851

(51) Int. Cl.[7] .................. H04N 5/335; H04N 5/235; G06K 9/00; G06K 6/32
(52) U.S. Cl. .................... 348/273; 348/222.1; 382/162; 382/167; 382/300
(58) Field of Search ................................ 348/278–280, 348/252, 162, 167, 222.1, 266, 272, 273; 382/300

(56) References Cited

U.S. PATENT DOCUMENTS

| | | | | |
|---|---|---|---|---|
| 4,630,307 A | * | 12/1986 | Cok | 382/165 |
| 5,307,159 A | * | 4/1994 | Hieda | 348/235 |
| 5,373,322 A | * | 12/1994 | Laroche et al. | 348/273 |
| 5,382,976 A | * | 1/1995 | Hibbard | 348/273 |
| 5,552,827 A | * | 9/1996 | Maenaka et al. | 348/266 |
| 5,629,734 A | * | 5/1997 | Hamilton et al. | 348/222.1 |
| 5,652,621 A | * | 7/1997 | Adams et al. | 348/272 |
| 5,805,217 A | * | 9/1998 | Lu et al. | 348/273 |
| 6,229,578 B1 | * | 5/2001 | Acharya et al. | 382/162 |
| 6,563,537 B1 | * | 5/2003 | Kawamura et al. | 348/222.1 |
| 6,570,616 B1 | * | 5/2003 | Chen | 348/272 |
| 6,628,327 B1 | * | 9/2003 | Aoki et al. | 348/221.1 |

* cited by examiner

Primary Examiner—Andrew Christensen
Assistant Examiner—Nhan Tran
(74) Attorney, Agent, or Firm—Knoble Yoshida & Dunlreavy, LLC

(57) ABSTRACT

The use of the orientation-sensitive interpolation filter coefficients generates the RGB signal values that are substantially same as those with the prior art filter coefficients for image data without abrupt intensity gradients. At the same time, the use of the same orientation-sensitive interpolation filter coefficients also helps generate the RGB signal values that represent the substantially reduced colors on the black-and-white horizontal stripes.

18 Claims, 13 Drawing Sheets

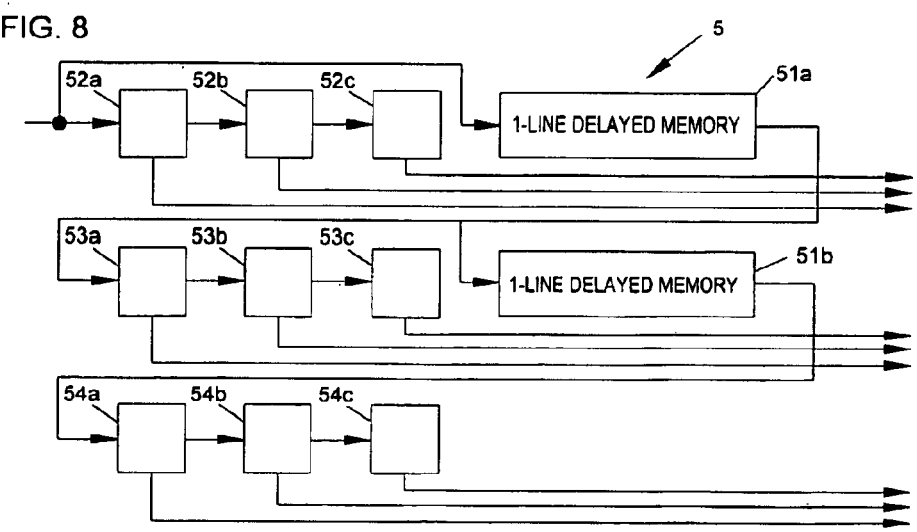

FIG. 3A
(PRIOR ART)

| 255 | 255 | 255 |
|---|---|---|
| 0 | 0 | 0 |
| 255 | 255 | 255 |

FIG. 3B
(PRIOR ART)

| 0 | 0 | 0 |
|---|---|---|
| 255 | 255 | 255 |
| 0 | 0 | 0 |

FIG. 9

| -1/8 | 1/2 | -1/8 | → 1/4 |
|---|---|---|---|
| 0 | 1/2 | 0 | → 1/2 |
| -1/8 | 1/2 | -1/8 | → 1/4 |

(R)

| 1/8 | 0 | 1/8 | → 1/4 |
|---|---|---|---|
| 0 | 1/2 | 0 | → 1/2 |
| 1/8 | 0 | 1/8 | → 1/4 |

(G)

| 1/8 | 0 | 1/8 | → 1/4 |
|---|---|---|---|
| 1/2 | -1/2 | 1/2 | → 1/2 |
| 1/8 | 0 | 1/8 | → 1/4 |

| 1/8 | 1/2 | 1/8 |
|---|---|---|
| 0 | -1/2 | 0 |
| 1/8 | 1/2 | 1/8 |
| ↓ | ↓ | ↓ |
| 1/4 | 1/2 | 1/4 |

(R)

| 1/8 | 0 | 1/8 |
|---|---|---|
| 0 | 1/2 | 0 |
| 1/8 | 0 | 1/8 |
| ↓ | ↓ | ↓ |
| 1/4 | 1/2 | 1/4 |

(G)

| -1/8 | 0 | -1/8 |
|---|---|---|
| 1/2 | 1/2 | 1/2 |
| -1/8 | 0 | -1/8 |
| ↓ | ↓ | ↓ |
| 1/4 | 1/2 | 1/4 |

|   |   |   |
|---|---|---|
| d | c | d |
| b | a | b |
| d | c | d |

FIG. 12

VERTICALLY-SENSITIVE FILTER COEFFICIENTS

| | R | G | B |
|---|---|---|---|
| 0/0 | 0, -1/4, 0 / 1/4, 1, 1/4 / 0, -1/4, 0 | 0, 1/4, 0 / 1/4, 0, 1/4 / 0, 1/4, 0 | 1/4, 1/4, 1/4 / -1/4, 0, -1/4 / 1/4, 1/4, 1/4 |
| 0/1 | -1/8, 0, -1/8 / 1/2, 1/2, 1/2 / -1/8, 0, -1/8 | 1/8, 0, 1/8 / 0, 1/2, 0 / 1/8, 0, 1/8 | 1/8, 1/2, 1/8 / 0, -1/2, 0 / 1/8, 1/2, 1/8 |
| 1/0 | 1/8, 1/2, 1/8 / 0, -1/2, 0 / 1/8, 1/2, 1/8 | 1/8, 0, 1/8 / 0, 1/2, 0 / 1/8, 0, 1/8 | -1/8, 0, -1/8 / 1/2, 1/2, 1/2 / -1/8, 0, -1/8 |
| 1/1 | 1/4, 1/4, 1/4 / -1/4, 0, -1/4 / 1/4, 1/4, 1/4 | 0, 1/4, 0 / 1/4, 0, 1/4 / 0, 1/4, 0 | 0, -1/4, 0 / 1/4, 1, 1/4 / 0, -1/4, 0 |

FIG. 13

HORIZONTALLY-SENSITIVE FILTER COEFFICIENTS

| | R | G | B |
|---|---|---|---|
| 0/0 | 0, 1/4, 0<br>-1/4, 1, -1/4<br>0, 1/4, 0 | 0, 1/4, 0<br>1/4, 0, 1/4<br>0, 1/4, 0 | 1/4, -1/4, 1/4<br>1/4, 0, 1/4<br>1/4, -1/4, 1/4 |
| 0/1 | 1/8, 0, 1/8<br>1/2, -1/2, 1/2<br>1/8, 0, 1/8 | 1/8, 0, 1/8<br>0, 1/2, 0<br>1/8, 0, 1/8 | -1/8, 1/2, -1/8<br>0, 1/2, 0<br>-1/8, 1/2, -1/8 |
| 1/0 | -1/8, 1/2, -1/8<br>0, 1/2, 0<br>-1/8, 1/2, -1/8 | 1/8, 0, 1/8<br>0, 1/2, 0<br>1/8, 0, 1/8 | 1/8, 0, 1/8<br>1/2, -1/2, 1/2<br>1/8, 0, 1/8 |
| 1/1 | 1/4, -1/4, 1/4<br>1/4, 0, 1/4<br>1/4, -1/4, 1/4 | 0, 1/4, 0<br>1/4, 0, 1/4<br>0, 1/4, 0 | 0, 1/4, 0<br>-1/4, 1, -1/4<br>0, 1/4, 0 |

FIG. 14

| v(i-1,j-1) | v(i,j-1) | v(i+1,j-1) |
|---|---|---|
| v(i-1,j) | v(i,j) | v(i+1,j) |
| v(i-1,j+1) | v(i,j+1) | v(i+1,j+1) |

FIG. 15

| 255 | 255 | 255 |
|---|---|---|
| 0 | 255 | 0 |
| 255 | 255 | 255 |

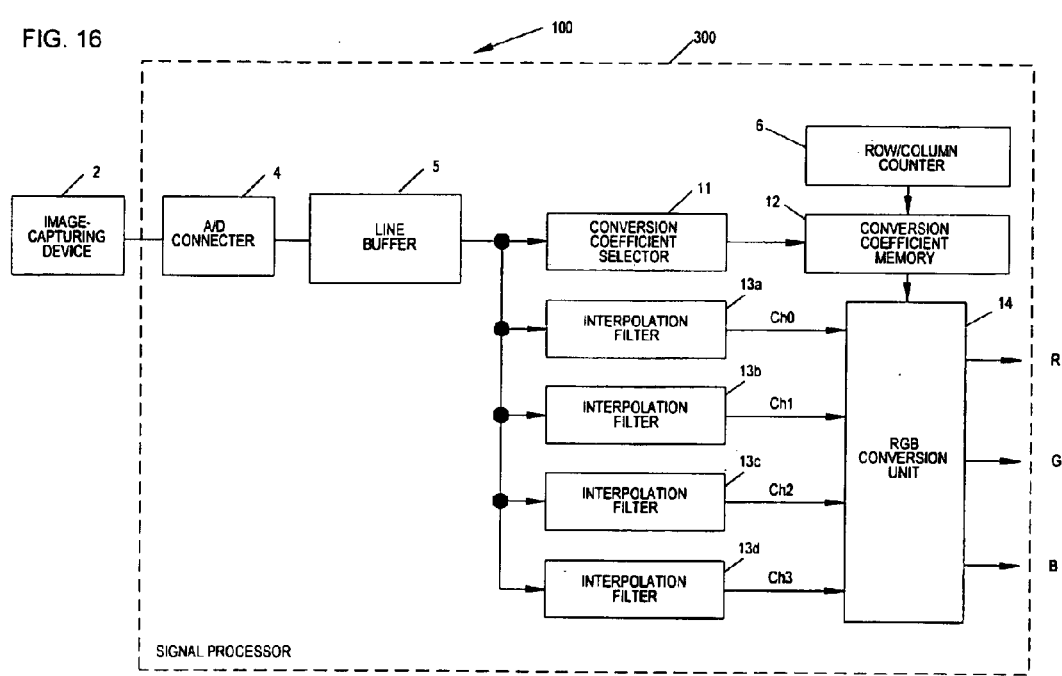

FIG. 17

| 1 | 0 | 1 |
|---|---|---|
| 0 | 0 | 0 |
| 1 | 0 | 1 |

Ch0

| 0 | 1 | 0 |
|---|---|---|
| 0 | 0 | 0 |
| 0 | 1 | 0 |

Ch1

| 0 | 0 | 0 |
|---|---|---|
| 1 | 0 | 1 |
| 0 | 0 | 0 |

Ch2

| 0 | 0 | 0 |
|---|---|---|
| 0 | 1 | 0 |
| 0 | 0 | 0 |

$$\text{POSITION}: 0/0 \begin{bmatrix} 0 & 1/4 & -1/4 & 1 \\ 0 & 1/4 & 1/4 & 0 \\ 1/4 & -1/4 & 1/4 & 0 \end{bmatrix}$$

$$\text{POSITION}: 0/1 \begin{bmatrix} 1/8 & 0 & 1/2 & -1/2 \\ 1/8 & 0 & 0 & 1/2 \\ -1/8 & 1/2 & 0 & 1/2 \end{bmatrix}$$

$$\text{POSITION}: 1/0 \begin{bmatrix} -1/8 & 1/2 & 0 & 1/2 \\ 1/8 & 0 & 0 & 1/2 \\ 1/8 & 0 & 1/2 & -1/2 \end{bmatrix}$$

$$\text{POSITION}: 1/1 \begin{bmatrix} 1/4 & -1/4 & 1/4 & 0 \\ 0 & 1/4 & 1/4 & 0 \\ 0 & 1/4 & -1/4 & 1 \end{bmatrix}$$

HORIZONTAL GRADIENT MATRIX $$\text{POSITION}: 0/0 \begin{bmatrix} 0 & -1/4 & 1/4 & 1 \\ 0 & 1/4 & 1/4 & 0 \\ 1/4 & 1/4 & -1/4 & 0 \end{bmatrix}$$

$$\text{POSITION}: 0/1 \begin{bmatrix} -1/8 & 0 & 1/2 & 1/2 \\ 1/8 & 0 & 0 & 1/2 \\ 1/8 & 1/2 & 0 & -1/2 \end{bmatrix}$$

$$\text{POSITION}: 1/0 \begin{bmatrix} 1/8 & 1/2 & 0 & -1/2 \\ 1/8 & 0 & 0 & 1/2 \\ -1/8 & 0 & 1/2 & 1/2 \end{bmatrix}$$

$$\text{POSITION}: 1/1 \begin{bmatrix} 1/4 & 1/4 & -1/4 & 0 \\ 0 & 1/4 & 1/4 & 0 \\ 0 & -1/4 & 1/4 & 1 \end{bmatrix}$$

VERTICAL GRADIENT MATRIX

DIRECTION-SENSITIVE CORRECTION METHOD AND SYSTEM FOR DATA INCLUDING ABRUPT INTENSITY GRADIENTS

FIELD OF THE INVENTION

The current invention is generally related to a method and a system for correcting image data, and more particularly related to a correctional method and system for correcting abrupt intensity data.

BACKGROUND OF THE INVENTION

In order to generate primary color signals for representing an image, a planar array of filtered charge-coupled devices (CCD) is placed in image-capturing devices such as a digital camera and a scanner. The planar array of CCDs also generates information related to the light intensity of an original image. For example, Japanese Patent Laid Publication Hei 2-128591 discloses the use of four color filters with the CCDs for first generating a first set of color signals each representing Magenta, Cyan, Yellow and Green and then converting them to a second set of signals representing Red, Green and Blue. This type of approach, however, tend to cause moire and undesirable colors on edges due to an arrangement of the color filters and interpolation.

To illustrate the above problem, referring to FIG. 1, an exemplary 3×3 color filtered CCDs are shown with solid lines. The color filter of the CCDs is indicated by R for red, G for green and B for Blue. These exemplary 3×3 CCDs arranged to include three rows of a top row having (G, R, G), a middle row having (B, G, B) and a bottom row having (G, R, G). The intensity signals generated by the above CCDs are interpolated by a set of interpolation filters such as shown in FIG. 2 in order to generate a set of RGB primary color signals. For example, the R signal is generated by multiplying a coefficient ½ to the corresponding R intensity signal which is located in the middle of the top and bottom rows and then by adding them. The G signal is generated by multiplying 1 to the corresponding G intensity signal which is located in the middle of the middle row. Lastly, the B signal is generated by multiplying a coefficient ½ to the corresponding B intensity signal which is located in the left and right of the middle row and then by adding them.

Now referring to FIGS. 3A and 3B, undesirable results in the RGB signals emerge when the same color filtered CCDs process an image containing abrupt intensity changes or abrupt gradients such as stripes. FIG. 3A illustrates that the above color filtered CCDs process horizontal 2-pixel-cycle black-and-white stripes. The top and bottom row CCDs process white image portions while the middle row CCD processes a black image portion. Using the same interpolation filters as shown in FIG. 2, the R signal is generated by multiplying a coefficient ½ to the corresponding R intensity signal having the value of 255 which is located in the middle of the top and bottom rows and then by adding them. The G signal is generated by multiplying 1 to the corresponding G intensity signal having the value of 0 which is located in the middle of the middle row. Lastly, the B signal is generated by multiplying a coefficient ½ to the corresponding B intensity signal having the value of 0 which is located in the left and right of the middle row and then by adding them. Thus, the ROB signals have the value of (255, 0, 0). This means that the color of the black-and-white stripes is now undesirably represented by red.

Referring to FIG. 3B, the above color filtered CCDs process the same frequency black-and-white horizontal stripes. However, the top and bottom row CCDs now process black image portions while the middle row CCD processes a white image portion. Using the same interpolation filters as shown in FIG. 2, the R signal is generated by multiplying a coefficient $V_2$ to the corresponding R intensity signal having the value of 0 which is located in the middle of the top and bottom rows and then by adding them. The G signal is generated by multiplying 1 to the corresponding G intensity signal having the value of 255 which is located in the middle of the middle row. Lastly, the B signal is generated by multiplying a coefficient ½ to the corresponding B intensity signal having the value of 255 which is located in the left and right of the middle row and then by adding them. Thus, the RGB signals have the value of (0, 255, 255). This means that the color of the black-and-white stripes is now undesirably represented by cyan.

As described in the above, the image processing method and system remains to be improved for substantially reducing the undesirable effects such as colored edges on black-and-white stripes as well as moire problems associated with abrupt gradients in the color images.

SUMMARY OF THE INVENTION

In order to solve the above and other problems, according to a first aspect of the current invention, a method of correcting data representing abrupt intensity gradient within a predetermined set of sampled areas, including the acts of: determining a direction of the abrupt intensity gradient; determining a set of correction coefficients based upon the direction; and correcting the data using the coefficients.

According to a second aspect of the current invention, a system for correcting data representing abrupt intensity gradient within a predetermined set of sampled areas, including: a direction determination unit for determining a direction of the abrupt intensity gradient; a coefficient determination unit connected to the direction determination unit for determining a set of correction coefficients based upon the direction; and a data correction unit connected to the coefficient determination unit for correcting the data using the coefficients.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 illustrates an exemplary set of interpolation filters.

FIGS. 3A and 3B illustrate undesirable results in the RGB signals when the prior-art interpolation filters process an image containing abrupt intensity changes or abrupt gradients such as stripes.

FIG. 7 illustrates four different patterns or arrangements of the color filters depending upon the location of a 3×3 color filter unit within a 4×4 CCD unit.

FIG. 8 illustrates one implementation of a line buffer unit.

FIG. 9 illustrates exemplary values for the orientation-sensitive interpolation filter coefficients for a 3×3 color-filtered CCD.

FIG. 10 illustrates another set of exemplary values for the orientation-sensitive interpolation filter coefficients for a 3×3 color-filtered CCD unit.

FIG. 11 illustrates a degree of freedom of four.

FIG. 12 illustrates exemplary sets of the vertical-stripe sensitive interpolation filter coefficients.

FIG. 13 illustrates exemplary sets of the horizontal-stripe sensitive interpolation filter coefficients.

FIG. 14 illustrates one designation for a pixel unit.

FIG. 15 is an exemplary image data containing a certain color pattern.

FIG. 16 illustrates a third preferred embodiment of the system for correcting image data including abrupt intensity gradient according to the current invention.

FIG. 17 illustrates that interpolation filters each have a unique pattern of interpolation filter coefficients.

FIG. 19 illustrates exemplary matrices for vertical and horizontal orientations.

DETAILED DESCRIPTION OF THE PREFERRED EMBODIMENT(S)

Figure 4A:
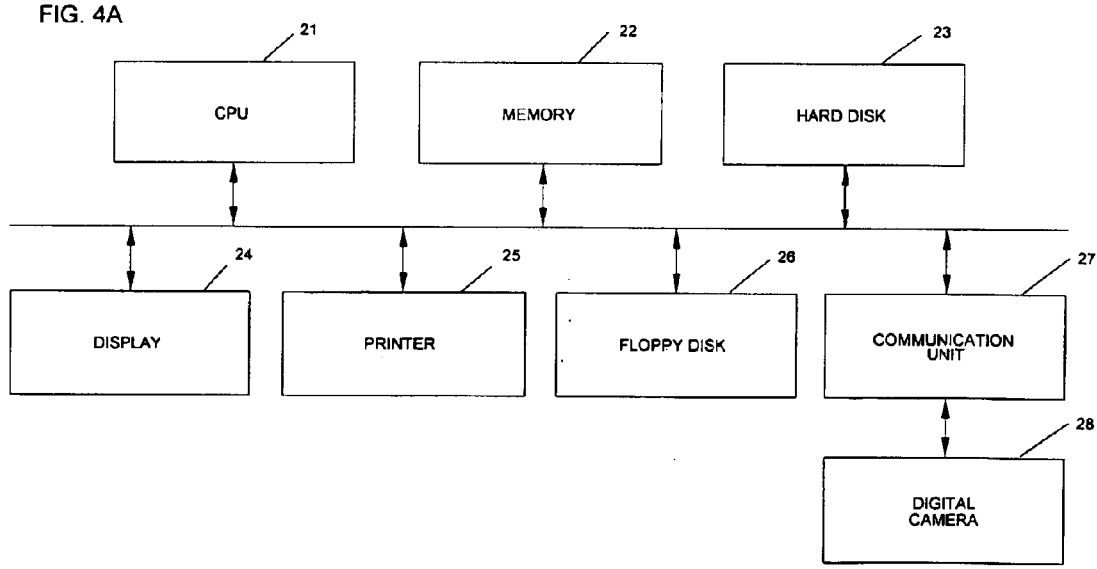
FIG. 4A illustrates one preferred embodiment of the system for correcting image data including abrupt intensity gradient according to the current invention.

Referring now to the drawings, wherein like reference numerals designate corresponding structure throughout the views, and referring in particular to FIG. 4A, one preferred embodiment of the system for correcting image data including abrupt intensity gradient according to the current invention includes an image-capturing device such as a digital camera 28 for capturing an image and a communication unit 27 for transmitting the digital image data to processing units. The processing units include storage devices such as a hard disk device 23 and a floppy disk device 26 for storing the digital image data and application programs, a main memory unit 22 and a central processing unit (CPU) for running an application program for correcting the image data based upon the orientation of abrupt intensity gradients, as well as output devices such as a printer 25 and a display monitor 24 for outputting the corrected image data. The corrected image data can be also stored in the storage devices.

Figure 4B:
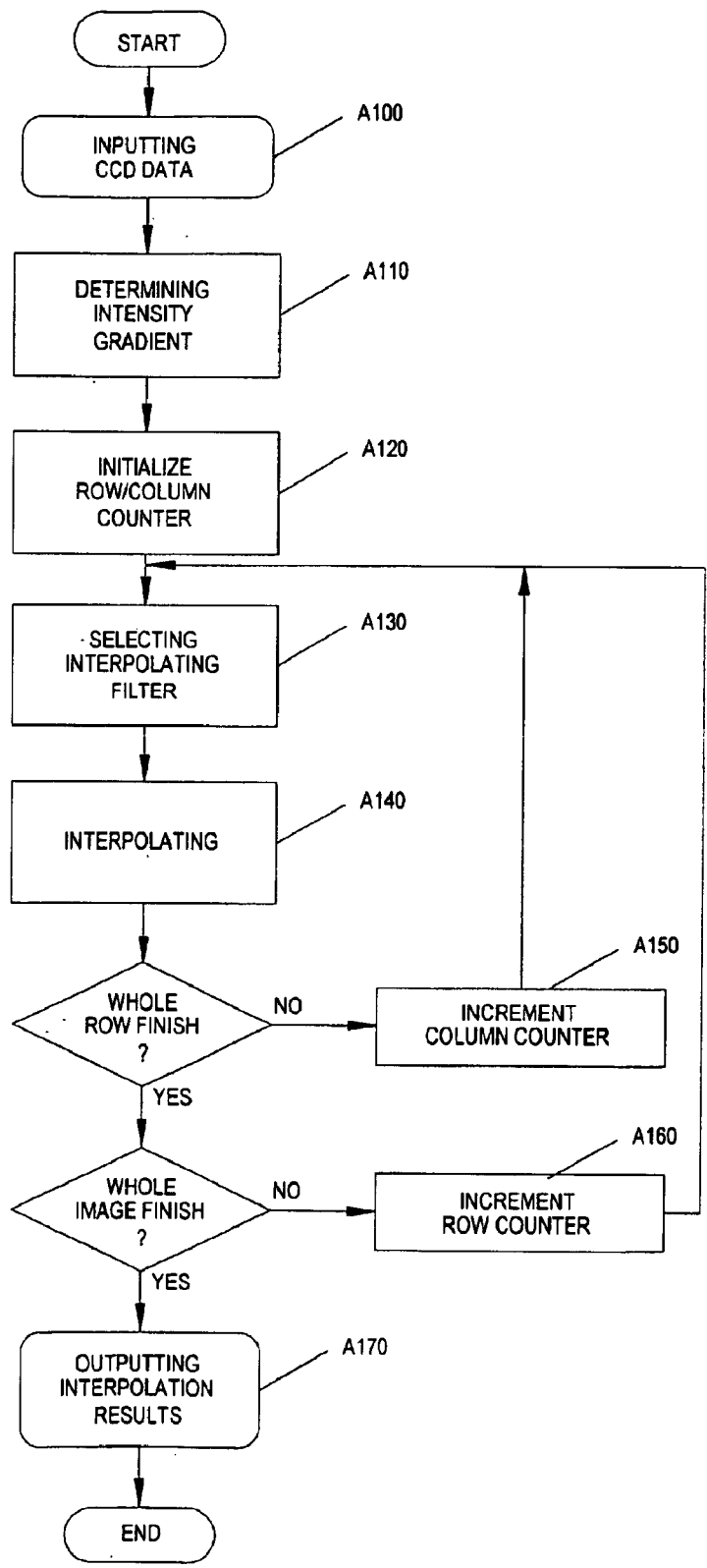
FIG. 4B illustrates acts involved in one preferred process of correcting image data including abrupt intensity gradient according to the current invention.

Referring to FIG. 4B, one preferred according to the current invention includes acts of correcting data representing abrupt intensity gradient within a predetermined set of sampled areas. The preferred process starts by inputting CCD data in act A100 and determines intensity gradient of the input data in act A110. After a row/column counter is initialized in act A120, a desired interpolation filter is selected based upon the intensity gradient which was determined in the act A110. Using the selected interpolation filter, the input CCD data is corrected one unit area at a time in act A140. If a row is not yet finished as found in act A155, the column counter is incremented and the process returns to the act A130. After each row is finished, the process now checks whether or not an entire image is completed in act A165. If it is not completely done, the row counter is incremented in act A160 and the process returns to the act A130. When the entire image is done, the process ends.

Figure 6:
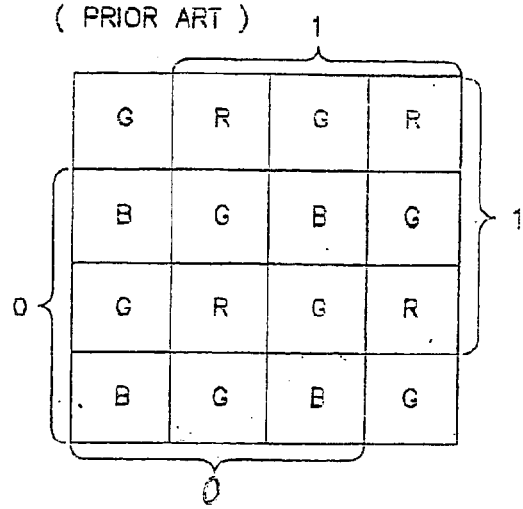
FIG. 6 illustrates the location of a 3×3 color filter unit within a 4×4 CCD Alt; unit.
Figure 5:
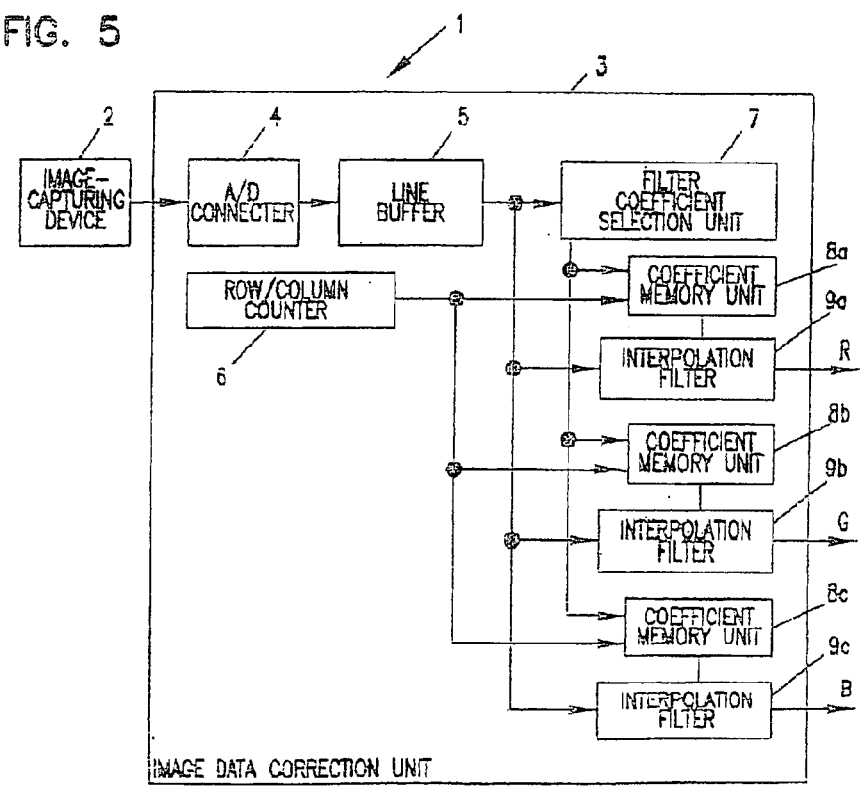
FIG. 5 illustrates a second preferred embodiment 1 of the system for correcting image data including abrupt intensity gradient according to the current invention.

Now referring to FIG. 5, a second preferred embodiment 1 of the system for correcting image data including abrupt intensity gradient according to the current invention generally includes an image-capturing device 2 for capturing an image and an image data correction unit 3 for correcting the image data representing the captured image. The image-capturing device 2 has a planar array of 2×2 CCD pixel units as indicated by brackets in FIG. 1. In this example, four 2×2 CCD units are repeatedly arranged so as to form a 4×4 CCD unit. Within the 4×4 CCD unit, one 3×3 color-filtered CCD unit is used to generate RGB signals as shown in solid lines in FIG. 1. The 3×3 color-filtered CCD unit includes a top row of (G, R, G), a middle row of (B, G, B) and a bottom row of (G, R, G). However, the 3×3 color-filtered CCD unit has four different patterns or arrangements of the color filters depending upon the location of a 3×3 unit within the 4×4 CCD unit as indicated by two pairs of brackets in FIG. 6. Both X (column) and Y (row) axes are each indicated by 0 and 1. FIG. 7 shows the four patterns of the 3×3 color-filtered CCD units based upon the combinations of the above rows and columns of color filters. The two-digit combination below each 3×3 color-filtered CCD unit in FIG. 7 indicates a row/column signal as shown in FIG. 6. For example, a 3×3 color-filtered unit 1/0 as shown in FIG. 7 has a top row of (G, R, G), a middle row of (B, G, B) and a bottom row of (G, R, G) and is located at row=1, column=0 in FIG. 6.

Still referring to FIG. 5, a second preferred embodiment of the image data correcting unit 3 further includes an analog-to-digital (A/D) conversion unit 4, a line buffer unit 5, a row/column counter 6, a filter coefficient selection unit 7, a set of coefficient memory units 8a–8c and a corresponding set of interpolation filters 9a–9c. The A/D conversion unit 4 converts an analog image signal from the image-capturing device 2 to a digital image signal in synchronous with a read clock signal. As shown in FIG. 8, the line buffer unit 5 can be implemented as first-in-first-out (FIFO) delayed line memory 51a and 51b as well as three sets of three latches 52a–52c, 53a–53c and 54a–54c which correspond to the 3×3 CCD unit and each set is serially connected to the line memory. The set of latches thus holds the serially transmitted image data representing the 3×3 pixel unit. The row/column counter 6 determines the pattern of the 3×3 color-filtered CCD units and generates the row/column signal which includes 0/0, 0/1, 1/0 or 1/1.

The filter coefficient selection unit 7 processes the 3×3 image data in a predetermined manner and compares it with a predetermined threshold. Based upon the comparison, the filter coefficient selection unit 7 generates a selection signal which is indicative of the orientation of stripes or abrupt intensity gradients in the image data. The selection signal values include 0, 1 and 2 which respectively indicate that the orientation of the abrupt intensity gradients is substantially vertical, horizontal and neither. The coefficient memory units 8a–8c each store predetermined sets of linear interpolation filter coefficients as shown in FIG. 2 as well as predetermined sets of orientation-sensitive interpolation filter coefficients for correcting the image data. Based upon the selection signal and the row/column signal, the filter coefficient selection unit 7 further selects a set of the orientation-sensitive interpolation filter coefficients or a set of linear interpolation filter coefficients. In other words, if the selection signal is either vertical or horizontal, the filter coefficient selection unit 7 selects a set of the orientation-sensitive interpolation filter coefficients based upon the selection signal and the row/column signal. On the other hand, if the selection signal is neither vertical nor horizontal, the filter coefficient selection unit 7 selects a set of the linear interpolation filter coefficients. The interpolation filters 9a–9c generate RGB signals by multiplying the image data from the line buffer unit 5 by the selected interpolation filter coefficients and adding them for each primary color.

Figure 1:
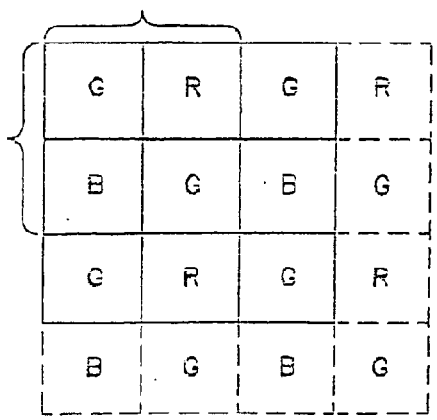
FIG. 1 illustrates an exemplary 3×3 color filtered CCDs.

FIG. 9 illustrates exemplary values for the orientation-sensitive interpolation filter coefficients for a 3×3 color-filtered CCD unit as shown in FIG. 1. Given abrupt intensity gradients, the idea is to generate at least the same G interpolated value using the orientation-sensitive interpolation filter coefficients while the colored edges or stripes are substantially reduced. In this regard, the orientation-sensitive liner interpolation coefficients for the R signal and the B signal are both ½ and are the same as the prior art coefficients as shown in FIG. 2. On the other hand, the orientation-sensitive interpolation coefficients for the G signal are $-\frac{1}{2}$ and $\frac{1}{8}$ and are different from the prior art coefficients as shown in FIG. 2. However, the total of the orientation-sensitive interpolation coefficients for the G signal is also one. Thus, if five intensity values for the CCDs corresponding to the C signal were the same, the result of the filter interpolation would be the same as that based upon the prior art coefficients. In addition, the sum of the coefficients in the top row, the middle row and the bottom row is respectively ¼, ½ and ¼ for each of the primary RGB colors. The sum of the coefficients in the top and bottom rows equals that in the middle row. This feature substantially reduces the undesirable coloring effect of the horizontal stripes or the horizontally abrupt intensity gradients. Using the above-described horizontal-stripe sensitive interpolation filter coefficients, the RGB signals would be (128, 128, 128) for the image data as shown in FIGS. 3A and 3B. In other words, the use of the horizontal-stripe sensitive interpolation filter coefficients as shown in FIG. 9 helps generate the RGB signal values that are substantially same as those with the prior art filter coefficients for image data without abrupt intensity gradients. At the same time, the use of the horizontal-stripe sensitive interpolation filter coefficients as shown in FIG. 9 also helps generate the RGB signal values that represent the substantially reduced colors on the black-and-white horizontal stripes.

FIG. 10 illustrates another set of exemplary values for the orientation-sensitive interpolation filter coefficients for a 3×3 color-filtered CCD unit as shown in FIG. 1. Given abrupt intensity gradients, the idea is to generate at least the same G interpolated value using the orientation-sensitive interpolation filter coefficients while the colored edges or stripes are substantially reduced. In this regard, the orientation-sensitive liner interpolation coefficients for the R signal and the B signal are both ½ and are the same as the prior art coefficients as shown in FIG. 2. On the other hand, the orientation-sensitive interpolation coefficients for the G signal are ½ and ⅛ and are different from the prior art coefficients as shown in FIG. 2. However, the total of the orientation-sensitive interpolation coefficients for the G signal is also one. Thus, if five intensity values for the CCDs corresponding to the G signal were the same, the result of the filter interpolation would be the same as that based upon the prior art coefficients. In addition, the sum of the coefficients in the left column, the middle column and the right column is respectively ¼, ½ and ¼ for each of the primary RGB colors. The sum of the coefficients in the right and left columns equals that in the middle column. This feature substantially reduces the undesirable coloring effect of the vertical stripes or the vertically abrupt intensity gradients. In other words, the use of the vertical-stripe sensitive interpolation filter coefficients as shown in FIG. 10 helps generate the RGB signal values that are substantially same as those with the prior art filter coefficients for image data without abrupt intensity gradients. At the same time, the use of the vertical-stripe sensitive interpolation filter coefficients as shown in FIG. 10 also helps generate the RGB signal values that represent the substantially reduced colors on the black-and-white verticals stripes.

Figure 11:
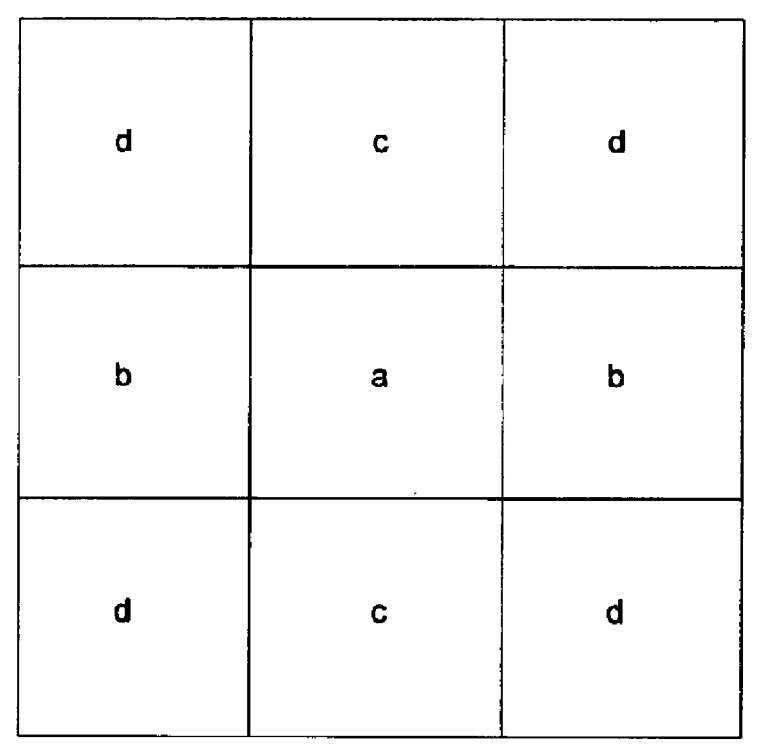

In order to illustrate how orientation-sensitive interpolation filter coefficients are determined, given a 3×3 pixel unit, interpolation filter coefficients have a degree of freedom of four in order to comply with right-left and top-bottom symmetries as shown as a, b, c and d in FIG. 11. Each of these letters represents an interpolation filter coefficient. Furthermore, these coefficients have to meet certain requirements. The requirements include that the sum of the coefficients corresponding to the R filters must be one while the sum of the coefficients corresponding to the G and B filters each has to be zero. In other words, the relationships among the coefficients as represented by the above letters in FIG. 11 have to satisfy the following equations: 2c=1, (a+4d) 0, and 2b=0 Additionally, in order to substantially reduce the undesirable effects of the horizontal 2-pixel-cycle black-and-white stripes, the sum of the coefficients in the top and bottom rows equals that in the middle row. That is, (2c+4d)=(2b+a). From this relationship, the interpolation filter coefficients for generating the R signal thus becomes a=½, b=0, c=½, and d=-⅛. By the same token, the interpolation filter coefficients for generating the G and B signals are also determined from the above relationships.

Now referring to FIG. 12, exemplary sets of the vertical-stripe sensitive interpolation filter coefficients are illustrated in a table for the use in one preferred embodiment of the system for correcting image data including abrupt intensity gradient according to the current invention. Each row specifies one of the four patterns or arrangements of the color filters depending upon the location of a 3×3 unit within the 4×4 CCD unit. Each column specifies one of the primary colors RGB. Thus, a combination of the filter pattern and the primary color specifies one of the twelve sets of the vertical-stripe sensitive interpolation filter coefficients. In each set of vertical-stripe sensitive interpolation filter coefficients, the sum of the coefficients in the right and left columns equals that in the middle column.

Referring to FIG. 13, exemplary sets of the horizontal-stripe sensitive interpolation filter coefficients are illustrated in a table for the use in one preferred embodiment of the system for correcting image data including abrupt intensity gradient according to the current invention. Each row specifies one of the four patterns or arrangements of the color filters depending upon the location of a 3×3 unit within the 4×4 CCD unit. Each column specifies one of the primary colors RGB. Thus, a combination of the filter pattern and the primary color specifies one of the twelve sets of the horizontal-stripe sensitive interpolation filter coefficients. In each set of horizontal-stripe sensitive interpolation filter coefficients, the sum of the coefficients in the top and bottom rows equals that in the middle row.

In the above described exemplary tables for the use with the preferred embodiment, since an interpolation filter for the 3×3 pixel unit has a degree of four and three are used for the primary colors RGB, only one remains for orientation. Thus, only horizontal and vertical choices are used for the orientation sensitivity. Although a interpolation filter larger than the 3×3 pixel unit may be used to increase the degree of freedom, because of the restrictions related to the RGB primary colors, the larger interpolation filter cannot match the frequency characteristics. As a result, such a large interpolation filter is affected by a peripheral input in the filter. That is, the larger the input intensity near the edge of the interpolation filter, the less accurate the interpolation becomes. Another effect of the larger interpolation filter size is that the associated hardware such as a buffer memory and an adder requires additional capacity.

Referring to FIG. 14, in order to determine the orientation of the intensity gradient, each filter element in a 3×3 pixel unit is designated by V (x, y) where x is (i−1), (i) or (i+1) while y is (j−1), (j) or (j+1). Element V(i, j) is defined to be a center element and is located in the middle row and the middle column. dl is an amount of intensity change in the left direction with respect to the central V (i, j) element. Similarly, dr is an amount of intensity change in the right direction with respect to the central V (i, j) element. du and dd are each an amount of intensity change respectively in the up and down directions with respect to the central V (i, j) element. ID summary, the following are defined:

$$dl = |V(i-1,j) - V(i,j)|$$

$$dr = |V(i+1,j) - V(i,j)|$$

$$du = |V(i,j-1) - V(i,j)|$$

$$dd = |V(i,j+1) - V(i,j)|$$

Then, a maximum of the above four values is determined. If the maximum is either dl or dr, it is determined that the intensity gradient is in a horizontal direction near the central V (i, j) element and the vertical-stripe sensitive interpolation filter coefficients are used to substantially reduce the undesirable effects of abrupt intensity gradients. On the other hand, if the maximum is either du or dd, it is determined that the intensity gradient is in a vertical direction near the central V (i, j) element and the horizontal-stripe sensitive interpolation filter coefficients are used to substantially reduce the undesirable effects of abrupt intensity gradients. In case the abrupt intensity gradient or stripes has slanted orientation in an image, the use of either the horizontal-stripe sensitive or vertical-stripe sensitive interpolation filter coefficients still results in some undesirable effects such as some moire.

In order to avoid the undesirable effects by the slanted stripes, the following equation is used:

$$dir = \max(dl, dr) - \max(du, dd) \qquad (2)$$

where dl, dr, du and dd are determined in the above equation (1) and max (dl, dr) selects the larger of the two while max (du, dd) selects the larger of the two. Furthermore, the dir value of the equation (2) is compared to a predetermined threshold value tr. If dir>tr, vertical-stripe sensitive interpolation filter coefficients are used. On the other hand, if dir<−tr, horizontal-stripe sensitive interpolation filter coefficients are used. Finally, if dir is in neither situations, the prior-art interpolation filter coefficients as shown in FIG. 2 are used. In order to specify one of the above three selections, for example, a coefficient selection signal having a value of 0, 1 or 2 is generated.

In summary, one preferred embodiment of the system for correcting image data including abrupt intensity gradient according to the current invention first converts an image signal from an analog image-capturing device 2 for each pixel into a digital signal via an A/D converter 4 and sends the digital signal to a line buffer 5. The line buffer 5 in turn takes out the digital data corresponding to a 3×3 pixel unit and sends it to a filter coefficient selection unit 7 and interpolation filters 9a–9c. A row/column counter 6 keeps track of the row and column numbers of a CCD unit in the image-capturing device 2 and generates a corresponding row/column signal indicative of a filter pattern. The row/column signal includes values 0/0, 0/1, 1/0 and 1/1, and the row/column counter 6 sends the row/column signal to coefficient memory units 8a–8c. The filter coefficient is selection unit 7 performs tasks as expressed in the above equations (1) and (2) on the digital image data from the line buffer 5 to generate a result dir. The filter coefficient selection unit 7 then compares the result dir to a predetermined threshold tr so as to output a selection signal (0, 1 or 2) to the coefficient memory units 8a–8c. The selection signal is indicative of a selected set of interpolation filter coefficients from a vertical-stripe sensitive group, a horizontal-stripe sensitive group and a prior-art group. Based upon the selection signal and the row/column signal, the coefficient memory units 8a–8c select a particular set of the interpolation filter coefficients from the stored groups of interpolation filter coefficients and outputs the selected interpolation filter coefficients to interpolation filters 9a–9c. Lastly, the interpolation filters 9a–9c generate RGB signals based upon the multiplication of the image data by the selected interpolation filter coefficients and the addition of the products. Accordingly, the undesirable effects such as coloration and moire are substantially reduced by the above described interpolation method based upon the orientation of the abrupt intensity gradients.

Referring to FIG. 15, an image containing a certain color pattern is considered. The image data contains a cyan color pattern, and the cyan color has RGB values of R=G=255 and B=0. As shown, the four corners pixels, the center pixel and the two middle column pixels in the up and bottom rows have a value of 255 while the two right and left column pixels in the middle row have a value of 0. Since there is no particular or single orientation in intensity gradient in the above described image data, the image data is determined to have neither orientation, and the interpolation filters 9a–9c outputs orientation-neutral RGB signals.

Referring to FIG. 16, a third preferred embodiment 100 of the system for correcting image data including abrupt intensity gradient according to the current invention generally includes an image-capturing device 2 for capturing an image and an image data correction unit 300 for correcting the image data representing the captured image. The image-capturing device 2 has a planar array of 2×2 CCD pixel units as indicated by brackets in FIG. 1. In this example, four 2×2 CCD units are repeatedly arranged so as to form a 4×4 CCD unit. As shown in FIG. 7, the four patterns of the 3×3 color-filtered CCD units based upon the combinations of the above rows and columns of color filters within the 4×4 CCD unit. The third preferred embodiment of the image data correcting unit 3 further includes an analog-to-digital (A/D) conversion unit 4, a line buffer unit 5, a row/column counter 6, a conversion coefficient selection unit 11, a conversion coefficient memory unit 12, a set of interpolation filters 13a–13d and a RGB conversion unit 14. The A/D conversion unit 4 converts an analog image signal from the image-capturing device 2 to a digital image signal in synchronous with a read clock signal. The line buffer unit 5 holds the serially transmitted image data representing the 3×3 pixel unit. The row/column counter 6 determines the pattern of the 3×3 color-filtered CCD units and generates the row/column signal which includes 0/0, 0/1, 1/0 or 1/1.

Still referring to FIG. 16, the conversion coefficient selection unit 11 processes the 3×3 image data in a predetermined manner as described above for the filter coefficient selection unit 7 in the second preferred embodiment and compares the with a predetermined threshold. Based upon the comparison, the conversion coefficient selection unit 11 generates a selection signal which is indicative of the orientation of stripes or abrupt intensity gradients in the image data. The selection signal values include 0, 1 and 2 which respectively indicate that the orientation of the abrupt intensity gradients is substantially vertical, horizontal and neither. The conversion coefficient memory unit 12 stores predetermined sets of linear interpolation filter coefficients as shown in FIG. 2 as well as predetermined sets of orientation-sensitive interpolation filter coefficients for correcting the image data. Based upon the selection signal and the row/column signal, the conversion coefficient selection unit 11 further selects a set of the orientation-sensitive interpolation filter coefficients or a set of linear interpolation filter coefficients. In other words, if the selection signal is either vertical or horizontal, the conversion coefficient selection unit 11 selects a set of the orientation-sensitive interpolation filter coefficients based upon the selection signal and the row/column signal. On the other hand, if the selection signal is neither vertical nor horizontal, the conversion coefficient selection unit 11 selects a set of the linear interpolation filter coefficients. The interpolation filters 13a–13d respectively represent channels Ch0, Ch1, Ch2 and Ch3 and respectively has a unique pattern of interpolation filter coefficients as shown in FIG. 17. Since the filter coefficients in Ch0–Ch3 are either 0 or 1, as shown below in equation (3), the task is simplified by selection and addition. Accordingly, a corresponding circuit is also simplified.

$$Ch0 = V_{i-1,j-1} + V_{i+1,j-1} + V_{i-1,j+1} + V_{i+1,j+1}$$

$$Ch1 = V_{i,j-1} + V_{i,j+1}$$

$$Ch2 = V_{i-1,j} + V_{i+1,j}$$

$$Ch3 = V_{i,j} \quad (3)$$

A RGB converter unit 14 generates RGB signals by matrix operation between the results of the above channels Ch0–Ch3 and the selected filter coefficients from the conversion coefficient memory 12 as shown in the following equation (4):

$$r = r0 Ch0 + r1 Ch1 + r2 Ch2 + r3 Ch3$$

$$g = g0 Ch0 + g1 Ch1 + g2 Ch2 + g3 Ch3$$

$$b = b0 Ch0 + b1 Ch1 + b2 Ch2 + b3 Ch3 \quad (4)$$

By substituting the above RGB matrix with the horizontally sensitive interpolation filter coefficient matrix as shown in equation (5), the RGB signals are generated by the following equation (7):

$$\begin{bmatrix} r0 & r1 & r2 & r3 \\ g0 & g1 & g2 & g3 \\ b0 & b1 & b2 & b3 \end{bmatrix} = \begin{bmatrix} -1/8 & 1/2 & 0 & 1/2 \\ 1/8 & 0 & 0 & 1/2 \\ 1/8 & 0 & 1/2 & -1/2 \end{bmatrix} \quad (5)$$

$$\begin{bmatrix} R \\ G \\ B \end{bmatrix} = \begin{bmatrix} -1/8(v(i-1,j-1)+v(i+1,j-1)+v(i-1,j+1)+v(i+1,j+1)) \\ \quad +1/2(v(i,j-1)+v(i,j+1))+1/2v(i,j) \\ 1/8(v(i-1,j-1)+v(i+1,j-1)+v(i-1,j+1)+v(i+1,j+1)) \\ \quad +1/2v(i,j) \\ 1/8(v(i-1,j-1)+v(i+1,j-1)+v(i-1,j+1)+v(i+1,j+1)) \\ \quad +1/2(v(i-1,j)+v(i+1,j))+1/2v(i,j) \end{bmatrix} \quad (7)$$

By substituting the above RGB matrix with the vertically sensitive interpolation filter coefficient matrix as shown in equation (6), the RGB signals are generated by the following equation (8):

$$\begin{bmatrix} r0 & r1 & r2 & r3 \\ g0 & g1 & g2 & g3 \\ b0 & b1 & b2 & b3 \end{bmatrix} = \begin{bmatrix} 1/8 & 1/2 & 0 & -1/2 \\ 1/8 & 0 & 0 & 1/2 \\ -1/8 & 0 & 1/2 & 1/2 \end{bmatrix} \quad (6)$$

$$\begin{bmatrix} R \\ G \\ B \end{bmatrix} = \begin{bmatrix} 1/8(v(i-1,j-1)+v(i+1,j-1)+v(i-1,j+1)+(i+1,j+1)) \\ v+1/2(v(i,j-1)+v(i,j+1))+1/2v(i,j) \\ 1/8(v(i-1,j-1)+v(i+1,j-1)+v(i-1,j+1)+(i+1,j+1)) \\ v+1/2v(i,j) \\ -1/8(v(i-1,j-1)+v(i+1,j-1)+v(i-1,j+1)+v(i+1,j+1)) \\ +1/2(v(i-1,j)+v(i+1,j))+1/2v(i,j) \end{bmatrix} \quad (8)$$

Thus, the above results are substantially the same as those obtained by using the interpolation filter coefficients as shown in FIGS. 9 and 10. The above matrices can be used for correcting colors in addition to the RGB conversion. Although multiplication processes are necessary, matrix operations are generally performed by relatively simple circuits.

Figure 18:
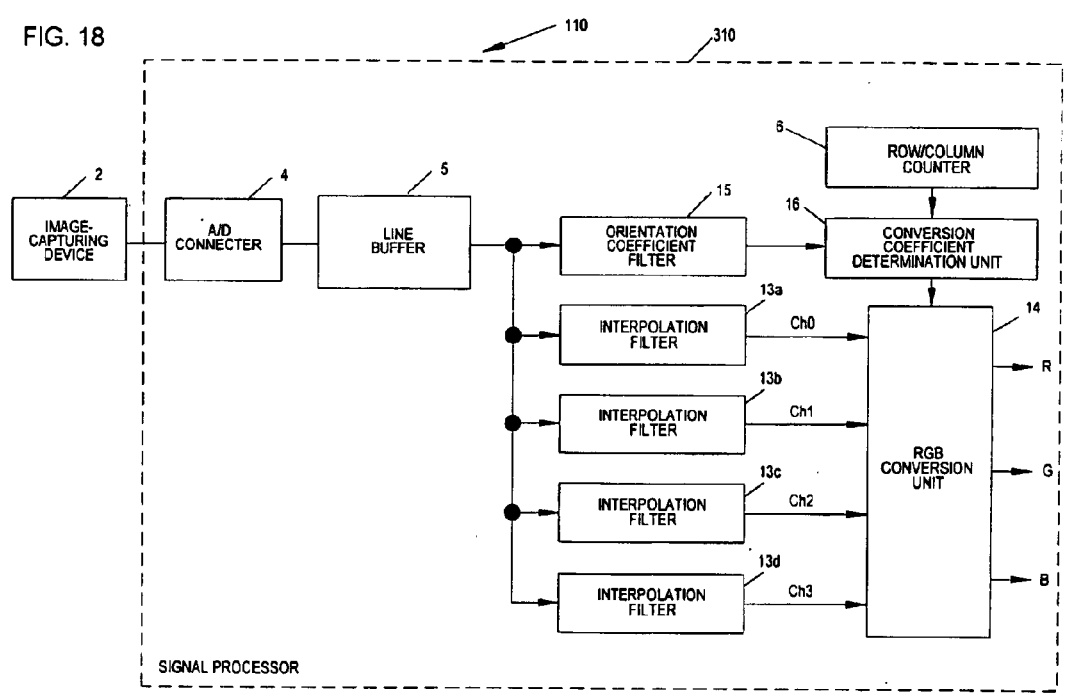
FIG. 18 illustrates a fourth preferred embodiment of the system for correcting image data including abrupt intensity gradient according to the current invention.

Referring to FIG. 18, a fourth preferred embodiment 110 of the system for correcting image data including abrupt intensity gradient according to the current invention generally includes an image-capturing device 2 for capturing an image and an image data correction unit 310 for correcting the image data representing the captured image. The image-capturing device 2 has a planar array of 2×2 CCD pixel units as indicated by brackets in FIG. 1. In this example, four 2×2 CCD units are repeatedly arranged so as to form a 4×4 CCD unit. As shown in FIG. 7, the four patterns of the 3×3 color-filtered CCD units based upon the combinations of the above rows and columns of color filters within the 4×4 CCD unit. The fourth preferred embodiment of the image data correcting unit 3 further includes an analog-to-digital (A/D) conversion unit 4, a line buffer unit 5, a row/column counter 6, an orientation coefficient filter 15, a conversion coefficient determination unit 16, a set of interpolation filters 13a–13d and a RGB conversion unit 14. The A/D conversion unit 4 converts an analog image signal from the image-capturing device 2 to a digital image signal in synchronous with a read clock signal. The line buffer unit 5 holds the serially transmitted image data representing the 3×3 pixel unit. The row/column counter 6 determines the pattern of the 3×3 color-filtered CCD units and generates the row/column signal which includes 0/0, 0/1, 1/0 or 1/1.

Still referring to FIG. 18, the orientation coefficient filter unit 15 processes the 3×3 image data in a predetermined manner as described above for the filter coefficient selection unit 7 in the second preferred embodiment and compares the result with a predetermined threshold tr. Based upon the comparison, the orientation coefficient filter unit 15 generates a direction signal D as shown below based upon the result dir after processing the image data as described in equations (1) and (2):

$$D = \begin{cases} 1 & (\text{if } dir > tr) \\ -1 & (\text{else if } dir < -tr) \\ dir/tr & (\text{otherwise}) \end{cases} \quad (9)$$

The direction signal D is a normalized result. The conversion coefficient determination unit 16 stores matrices of incline orientation coefficients for each row/column signal as well as for the three directions (−1, 1 or dir/tr). FIG. 19 illustrates exemplary matrices for vertical and horizontal orientations. Based upon the row/column signal, the conversion coefficient determination unit 16 selects a matrix of the orientation-sensitive interpolation filter coefficients or a set of linear interpolation filter coefficients and multiplies the selected matrix by the directional signal D. The conversion coefficient determination unit 16 outputs the above product to the RGB conversion unit 14. The RGB conversion unit 14 performs a matrix operation on the outputs Ch0–Ch3 of the interpolation filters 13a–13d and the above product from the conversion coefficient determination unit 16. Since the directional signal D ranges between 1 and −1 and the RGB conversion matrix is continuously modified by the directional signal D, the orientation sensitivity is continuous between the horizontal and vertical stripes. In other words, two pairs of interpolation coefficients r0, r3 and b0, b3 in the equations (5) and (6) have opposite signs, and these interpolation coefficients are multiplied by the directional signal D which ranges from 1 to −1. Thus, the correction substantially reduces the undesirable effects of the abrupt intensity gradients at any orientation in a continuous manner.

Figure 20:
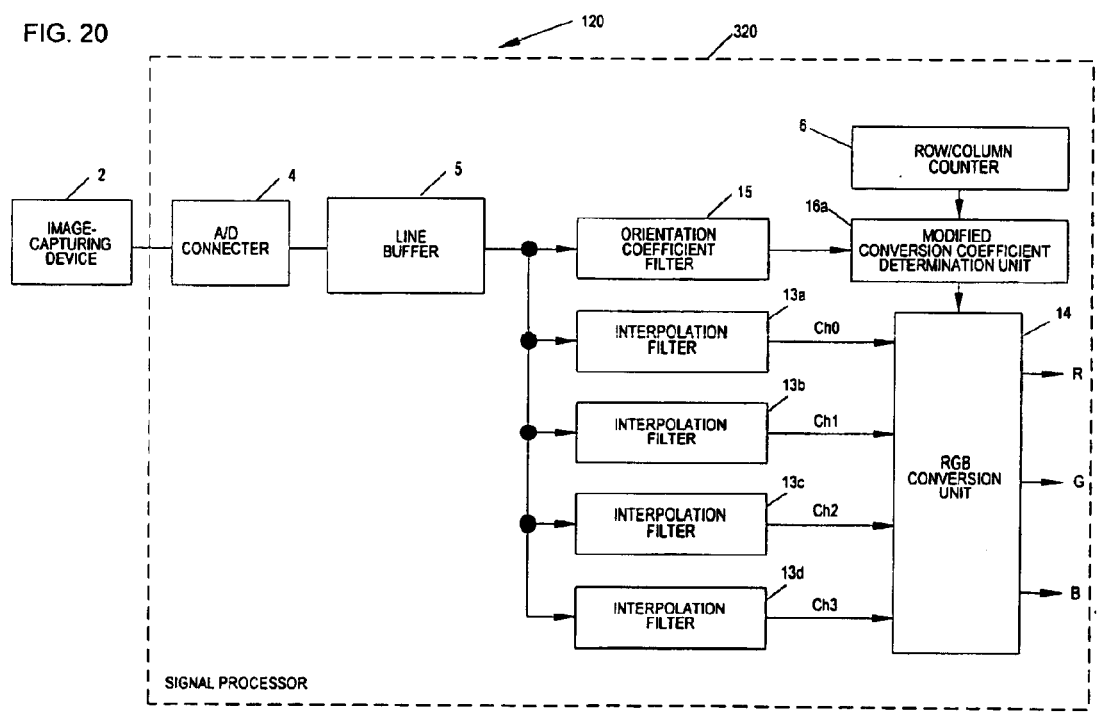
FIG. 20 illustrates an alternative embodiment to the third and fourth preferred embodiments according to the current invention.

Referring to FIG. 20, in stead of modifying the interpolation coefficients in the RGB conversion matrix as in the above described third and fourth preferred embodiments, an alternative embodiment corrects the data Ch0–Ch3 from the interpolation filters 13a–13d using the directional signal D. In other words, the orientation coefficient filter unit 15 outputs the directional signal D directly to the RGB conversion unit 14. A modified conversion coefficient determination unit 16a stores matrices of incline orientation coefficients for each row/column signal as well as for the three directions (−1, 1 or dir/tr). FIG. 19 illustrates exemplary matrices for vertical and horizontal orientations. Based upon the row/column signal, the modified conversion coefficient determination unit 16a selects a matrix of the orientation-sensitive interpolation filter coefficients or a set of linear interpolation filter coefficients and outputs the selected matrix to the RGB conversion unit 14. The RGB conversion unit 14 generates the RGB signals based upon the outputs Ch0–Ch3 of the interpolation filters 13a–13d and the directional signal D from the orientation coefficient filter unit 15 using the following equation (10).

$$R = r0DCh0 + r1Ch1 + r2Ch2 + r3DCh3$$
$$G = g0DCh0 + g1Ch1 + g2Ch2 + g3DCh3$$
$$B = b0DCh0 + b1Ch1 + b2Ch2 + b3DCh3 \quad (10)$$

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of correcting data representing abrupt intensity gradient within a predetermined set of sampled areas, comprising the acts of:
    a) determining a continuous direction of the abrupt intensity gradient of RGB data between a horizontal direction and a vertical direction;
    b) adjusting a RGB conversion matrix of orientation-sensitive correction coefficients based upon the direction; and
    c) correcting the data based upon the adjusted RGB conversion matrix of the correction coefficients to perform a sum of products operation on the RGB data.

2. The method of correcting data according to claim 1 wherein the abrupt intensity gradient is stripes.

3. The method of correcting data according to claim 2 wherein the direction of the stripes is horizontal.

4. The method of correcting data according to claim 2 wherein the direction of the stripes is vertical.

5. The method of correcting data according to claim 1 wherein the sampled areas are covered by a planar array of color area image sensors.

6. The method of correcting data according to claim 1 wherein color image area sensors generate primary colors.

7. The method of correcting data according to claim 6 wherein for each of the primary colors, the correction coefficients are selected based upon the direction of the abrupt intensity gradient.

8. The method of correcting data according to claim 7 wherein the direction includes a vertical type and a horizontal type.

9. The method of correcting data according to claim 8 wherein the correction coefficients are selected additionally based upon a pattern of the planar array of the color area image sensors.

10. The method of correcting data according to claim 7 wherein the direction includes a vertical type, a horizontal type and an all-other type.

11. A system for correcting data representing abrupt intensity gradient within a predetermined set of sampled areas, comprising:
    a direction determination unit for determining a continuous direction of the abrupt intensity gradient in RGB data between a horizontal direction and a vertical direction;

a coefficient determination unit connected to the direction determination unit for adjusting a RGB conversion matrix of orientation-sensitive correction coefficients from predetermined sets of the correction coefficients based upon the direction; and a data correction unit connected to the coefficient determination unit for correcting the data based upon the adjusted RGB conversion matrix of the correction coefficients to perform a sum of product operation on the RGB data.

12. The system for correcting data according to claim 11 wherein the direction determination unit detects the direction of the abrupt intensity gradient including vertical stripes and horizontal stripes.

13. The system for correcting data according to claim 11 further includes a planar array of color area image sensors for generating signals representing primary colors in the sampled areas.

14. The system for correcting data according to claim 13 wherein the coefficient determination unit selects the set of correction coefficients based upon the direction of the abrupt intensity gradient for each of the primary colors.

15. The system for correcting data according to claim 14 wherein the direction determination unit determines a vertical type and a horizontal type.

16. The system for correcting data according to claim 15 wherein the coefficient determination unit selects the set of correction coefficients additionally based upon a pattern of the planar array of the color area image sensors.

17. The system for correcting data according to claim 15 wherein the direction determination unit determines a vertical type, a horizontal type and an all-other type.

18. A medium containing computer instructions performing a task of correcting data representing abrupt intensity gradient within a predetermined set of sampled areas, comprising the acts of:

determining a continuous direction of the abrupt intensity gradient including stripes between a horizontal direction and a vertical direction, the sampled areas being covered by a planar array of color area image sensors, the color area image sensors generating primary colors;

adjusting a RGB conversion matrix orientation-sensitive of correction coefficients based upon the direction; and correcting the data based upon the adjusted RGB conversion matrix of the correction coefficients to perform a sum of products operation on the RGB data.

* * * * *